(12) United States Patent
Boronkay

(10) Patent No.: US 6,746,532 B2
(45) Date of Patent: Jun. 8, 2004

(54) LIGHTWEIGHT CONCRETE WITH INCREASED STRENGTH AND METHOD FOR PRODUCING THE SAME

(76) Inventor: Gábor Boronkay, Rácz Erzsebet Karthauzi u. 15/b, 1121 Budapest (HU)

( * ) Notice: Subject to any disclaimer, the term of this patent is extended or adjusted under 35 U.S.C. 154(b) by 0 days.

(21) Appl. No.: 10/075,405

(22) Filed: Feb. 13, 2002

(65) Prior Publication Data

US 2003/0145765 A1 Aug. 7, 2003

(30) Foreign Application Priority Data

Feb. 7, 2002 (HU) .......................................... 200205406

(51) Int. Cl.$^7$ ........................... C04B 38/00; C04B 38/08
(52) U.S. Cl. ..................... 106/724; 106/672; 106/676; 106/677; 106/697; 264/333; 52/745.19; 52/742.12
(58) Field of Search ................................ 106/672, 676, 106/677, 697, 724; 264/333; 52/745.19, 742.14

(56) References Cited

U.S. PATENT DOCUMENTS

| | | | | |
|---|---|---|---|---|
| 5,639,297 A | * | 6/1997 | Stracke et al. | 106/677 |
| 5,737,896 A | * | 4/1998 | Rodgers | 52/745.2 |
| 5,974,762 A | * | 11/1999 | Rodgers | 52/742.14 |
| 6,290,769 B1 | * | 9/2001 | Carkner | 106/675 |

OTHER PUBLICATIONS

"Perform Wall Panel System," *Internet*, Copyright© 2001 by Perform Wall, LLC, http://www.performwall.com/dis-c.htm.

"Guild Members Use Rastra," EcoBuilding Times, vol. 6.2, *Internet*, Copyright© 2001 by Northwest EcoBuilding Guild, Http://www.ecobuilding.org/lib/ebt/2000/userast-a.htm.

Timmons, "Alternative Building System Saves Energy," EDC, *Internet*, Feb. 22, 2001, http://www.edcmag.com/CDA/ArticleInformation/features/BNP.

"Rastra, The Environmentally Friendly Solution," *Internet*, Copyright © 1999 by Rastra Found, Liechtenstein, http://www.rastra.com/wi_ra.htm.

* cited by examiner

*Primary Examiner*—Elizabeth D. Wood
(74) *Attorney, Agent, or Firm*—Klarquist Sparkman, LLP

(57) ABSTRACT

A method for producing lightweight concrete is disclosed which comprises mixing foamed particles, aggregates, and cement slurry to create a strong, lightweight concrete. The foamed particles can be created by grinding foamed plastic waste material. The aggregates comprise soluble glass, water, and polyvinyl acetate. One embodiment includes batching the cement in two stages. The concrete is pressed to within 65–70% of its volume prior to drying. Lightweight concrete comprising foamed plastic particles mixed with cement, water, soluble glass, and polyvinyl acetate is also disclosed, where the concrete, after compacting and drying possesses greater strength than common polystyrofoam concrete.

17 Claims, 1 Drawing Sheet

LIGHTWEIGHT CONCRETE WITH INCREASED STRENGTH AND METHOD FOR PRODUCING THE SAME

CROSS REFERENCE TO RELATED APPLICATION

The present application claims priority to Hungarian Patent Application 0205406, filed Feb. 7, 2002.

BACKGROUND OF THE INVENTION

1. Field of the Invention

The invention relates to a lightweight concrete composition containing foamed plastic balls or particles obtained by grinding foamed plastic waste material. The invention also relates to a method for the production of lightweight concrete composition wherein foamed plastic balls or particles obtained by grinding foamed plastic waste material are mixed with cement.

2. Description of the Related Art

The Hungarian Patent No. 181180 prepares polystyrofoam (PSF) concrete by using polystyrofoam beads mounting up to 60–70% of the volume of crude concrete. The polystyrofoam beads are mixed with water or with the water content of the sand, and then the mix is compacted (by vibrating press) after being poured into formwork. The concrete produced in this way—as a consequence of volumetric proportions—has the disadvantage of high gravimetric density, and, as a consequence, reduced heat-insulating capacity. At the same time, the bond of concrete and PSF in not ensured. (Generally lightweight concrete not reaching the value of 350–400 kg/m3 cannot be vibrated).

The process in Patent No. 213905 B applies soda soluble glass (15–18 l/m3) to treat PSF—to increase bonding—and, in this manner, manufactures building-block elements, and different materials for construction industry application.

The process in Hungarian Patent No. 174868 provides for bonding of PSF and cement by adding aluminum hydrosilicate to the mix, and, thus renders it thixotrope. The prepared mix is worked in a mold or framework. This process does not activate the surface of the PSF aggregate, but pulps the cement (using bentonite) to create better bonding.

The U.S. Pat. No. 5,639,297 aims for an increase in strength of PSF concrete in such a way that heat treats the PSF granules before being added, so that it shrinks them and hardens their surface. The disadvantage of the process is the fact that the increase of strength requires significant expenditure of energy, which involves cost increment.

These processes offer solutions to two problem ranges: on the one hand, to enhance problematic bonding capacity of PSF and cement slurry, and, on the other hand, to increase the strength of lightweight concrete. The goal is only reached by deteriorating advantageous properties (181180) or by significant cost increment (5,639,297), and the compositions prepared with the applied bonding additives, in many of the cases, do not meet the required or necessary strength values, and, consequently, have limited application.

SUMMARY OF THE INVENTION

The main objective of the present invention is to provide a lightweight concrete composition that preserves the advantageous properties (good heat-insulating capacity, low gravimetric density, good water vapor permeation capability, etc.) of the conventional lightweight—primarily polystyrofoam—concrete. Nevertheless, by virtue of its increased strength, it can be used in even more complex situations and in a wider range of application fields of the construction industry than conventional concrete.

The basic idea of this invention is to add a polymer dispersion to lightweight concrete composition because, with this, the properties of lightweight concrete, in fresh and also in solid state (after having set and hardened), improve considerably. The appropriate polymer dispersion also improves the homogeneity, stability and workability of the mix.

By dosing the polymer dispersion properly, a further bond system is introduced in the mix, which also modifies the water relations of the composition: while the cement is setting during water absorption, the polymer dispersion hardens when the water has left (drying). Therefore, during the application of the process it must be taken into consideration that the state when the load can be applied sets in later—in fact, after drying.

Simultaneously, as a new effect, the dispersed polymer particles also tie the components of the mix with adhesive bonding.

The invention is based on the additional idea that, after having improved the plasticity and compactibility of lightweight concrete with the above stated process, the prepared mix is to a large extent compressible. This increases further the strength improved by adhesive bonding.

The invention is also based on the idea that any profiled shape can be sawn out of the increased strength lightweight concrete block by moving an endless coarse steel wire in longitudinal and transverse direction.

The method of this invention enables the forming of more favorable and up-to-date lightweight concrete form blocks for concrete-filled masonry than the currently used ones. The currently produced form blocks have grooves at their edges, and, thus, the narrowed edges easily damage whilst transported and assembled. The form blocks butt with their plane surface so they can shift along this surface when the concrete is poured. Usually, manufacturing such form blocks requires expensive press dies, and, consequently, the blocks have a minimal size choice. The dimension of the houses constructed with them is limited by the form block types.

The basis of the invention is constituted by the perception that, in case we create increased strength lightweight concrete masonry to fill with concrete by sawing the form blocks, we can choose the block dimensions at discretion, prevent block movement by tongue-and-groove joint, and create the cavity inside the blocks. Then these blocks permit freer dimensioning, reduced risk of damage and more secure concrete filling. Due to the applied technology, the cavities do not need to be formed centrally. Therefore, the constructed masonry can have a thicker and more efficient heat-insulating layer on its exterior.

Various optional or preferred features are set out in the detailed description forming part of this specification.

BRIEF DESCRIPTION OF THE DRAWINGS

Embodiments of this invention will now be described by way of example with reference to the accompanying drawings, which

DETAILED DESCRIPTION OF THE PREFERRED EMBODIMENTS

Figure 1:
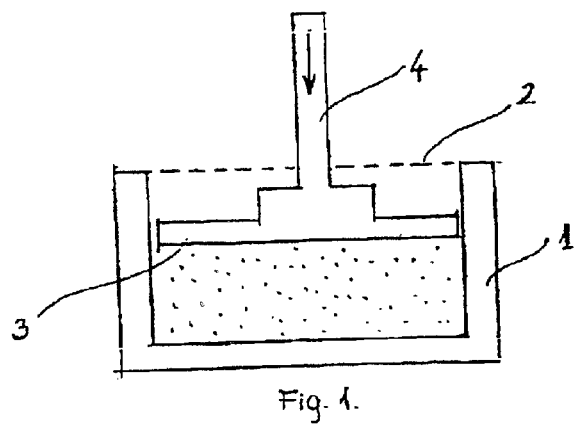
FIGS. 1 to 4 illustrate preferred realizations of the method as in this invention.
Figure 2:
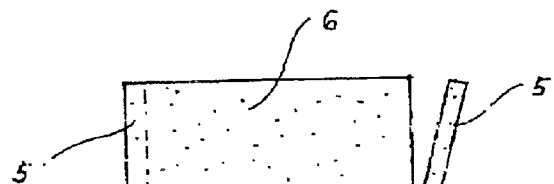
Figure 3:
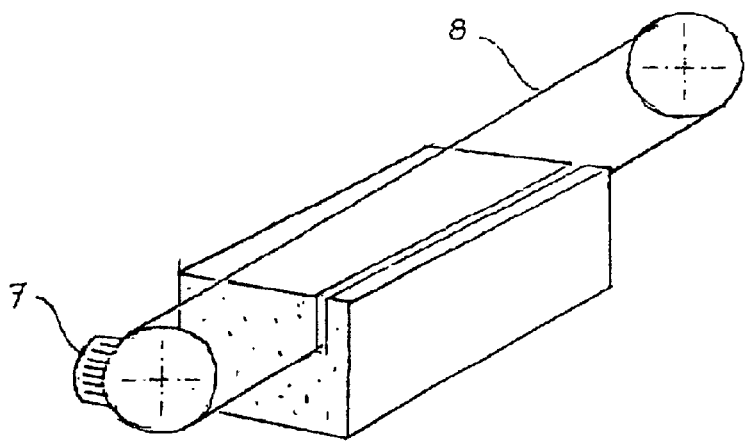
Figure 4:
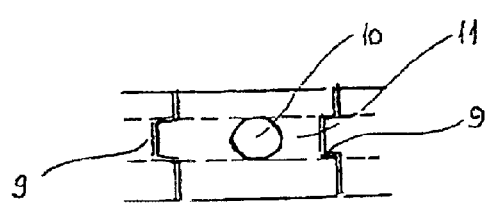

The lightweight concrete compositions as in this invention are produced according to the method of this invention, as shown in the following examples.

Example 1

We filled up a 500 l compulsory-type mixer with polystyrofoam granule (2–10 mm) prepared by grinding packaging material. Then we added a mix composed of 20 l water, 5 l soda soluble glass and 8 l of 50% polyvinyl acetate. After this, we filled 50 kg of portland cement in the mixer, and mixed for 2 minutes. Then we added further 50 kg of cement and 25 l water and mixed the whole for another 2 minutes.

Example 2

We poured the lightweight concrete as per Example 1 into mold in such a way that the poured payers were pressed (4) to 65–70% (3) of their original height (2).

The form blocks prepared so proved to have 320 kg/m$^3$ gravimetric density and 4.5 kg/cm$^2$ compressive strength. This is a considerable increase of strength compared to the common polystyrofoam concrete.

We experienced that the above way of pressing in the molds was not as effective in the areas near the mold walls (5) as in other areas (6). Therefore, these reduced strength parts were sawn off the ready form blocks, and the different construction materials were prepared out of the "core block" with wood working industry methods. The sawing was made by lowering an electric motor (7) driven endless coarse steel wire (8) into the lightweight concrete block to cut.

Example 3

The mixing of the components as per Example 1 was made in such a way that the cement and the water, the soda soluble glass and the polyvinyl acetate was introduced in the mixer first to create slurry. The 500 l PSH aggregate was added to this slurry.

Example 4

The lightweight concrete block prepared according to the procedure of Example 2 was sawn into prism-shaped pieces that opposite faces were shaped tongue-and-groove (9). In the prism we drilled a longitudinal bore (10) and transversal bores orthogonally, from the tongue-and-groove sides (11).

We aligned the prisms prepared so in vertical position, one close to the next, and filled them with fluid concrete.

The increased strength form blocks endured the transverse concrete pressure. The concrete that flowed through the bores and hardened in horizontal rods linked the concrete pillars realized in this way. The structure formed is a both side heat insulated concrete pillar framework wall.

Example 5

The lightweight concrete block prepared according to the procedure of Example 2 was sawn into prism-shaped pieces again and the opposite faces were shaped half-grooves. The prisms placed in horizontal plane close to each other form a grooved surface that constitutes formwork for reinforced concrete slab-and-beam floor.

Example 6

The lightweight concrete blocks prepared according to the procedure of Example 2 were sawn into panels of different thickness, which can be used as heat insulation or as profiled insert pieces of light construction walls.

I claim:

1. A method for producing lightweight concrete composition, comprising:

grinding foamed plastic waste material into foamed plastic particles;

mixing the plastic particles with water, soda soluble glass and polyvinyl acetate; and mixing cement into the mixture, wherein the mixing the cement is batched in two stages.

2. The method as claimed in claim 1, further comprising:

first preparing a cement slurry in a mixer with aggregates; and then adding the plastic particles to this slurry.

3. The method as claimed in claim 1, further comprising:

pouring the mixture of cement slurry and aggregates into a mold; and then pressing the mixture to 65–70% of its original volume.

4. The method as claimed in claim 2, further comprising:

pouring the mixture of cement slurry and the aggregates into a mold; and then pressing the mixture to 65–70% of its original volume.

5. The method as claimed in claim 1, further comprising:

pouring the cement mixture into a mold having walls;

after drying, cutting off the surfaces adjoining the mold walls; and manufacturing a construction material of homogenous strength by sawing, milling and drilling to provide optional forms of the construction material.

6. The method as claimed in claim 2, wherein the mold has walls, the method further comprising:

after drying, cutting off the surfaces adjoining the mold walls and manufacturing a construction material of homogenous strength by sawing, milling and drilling to provide optional forms of the construction material.

7. The method as claimed in claim 3, wherein the mold has walls, the method further comprising:

after drying, cutting off the surfaces adjoining the mold walls and manufacturing a construction material of homogenous strength by sawing, milling and drilling to provide optional forms of the construction material.

8. The method as claimed in claim 1, further comprising:

sawing the increased strength lightweight concrete into heat insulating panels.

9. The method as claimed in claim 2, further comprising:

sawing the increased strength lightweight concrete into heat insulating panels.

10. The method of claim 3, further comprising:

sawing the increased strength lightweight concrete into heat insulating panels.

11. The method of claim 5, further comprising:

sawing the increased strength lightweight concrete into heat insulating panels.

12. The method as claimed in claim 5, wherein the cutting and sawing of the construction material is provided by moving a coarse steel wire in a longitudinal and transverse direction of a workpiece.

13. The method as claimed in claims 8, wherein the cutting and sawing of the construction material is provided by moving a coarse steel wire in a longitudinal and transverse direction of a workpiece.

14. The method as claimed in claim 5, further comprising:

forming the construction material as blocks having holes in them;

joining the blocks to each other by tongue-and-groove connection; and thereafter, filling the holes within the form blocks with concrete to produce formwork blocks for use as different performance walls and floors.

15. The method as claimed in claim 8, further comprising:

forming the construction material as blocks having holes in them;

joining the blocks to each other by tongue-and-groove connection; and thereafter, filling the holes within the form blocks with concrete to produce formwork blocks for use as different performance walls and floors.

16. The method as claimed in claim 12, further comprising:

forming the construction material as blocks having holes in them;

joining the blocks to each other by tongue-and-groove connection; and thereafter, filling the holes within the form blocks with concrete to produce formwork blocks for use as different performance walls and floors.

17. The method as claimed in claim 16, further comprising, before filling with concrete, inserting reinforcing steel rods into the holes of the form blocks.

* * * * *